United States Patent [19]

Miller

[11] 4,309,276

[45] Jan. 5, 1982

[54] HYDROCARBON CONVERSION WITH LOW-SODIUM SILICALITE

[75] Inventor: Stephen J. Miller, El Cerrito, Calif.

[73] Assignee: Chevron Research Company, San Francisco, Calif.

[21] Appl. No.: 144,474

[22] Filed: Apr. 28, 1980

[51] Int. Cl.³ .................... C10G 11/02; C10G 47/02
[52] U.S. Cl. .................... 208/109; 208/118; 208/120; 208/134; 252/455 R; 252/455 Z; 423/335; 585/648; 585/654
[58] Field of Search ............ 208/134, 108-120; 585/648-662

[56] References Cited

U.S. PATENT DOCUMENTS

| | | | |
|---|---|---|---|
| 2,326,703 | 8/1943 | Thiele et al. | 208/134 X |
| 3,700,585 | 10/1972 | Chen et al. | 208/111 |
| 3,941,871 | 3/1976 | Dwyer et al. | 423/326 |
| 4,061,724 | 12/1977 | Grose et al. | 423/335 |
| 4,073,865 | 2/1978 | Flanigan et al. | 423/335 X |
| 4,171,257 | 10/1979 | O'Rear et al. | 208/120 |
| 4,238,318 | 12/1980 | Kouwenhoven | 208/120 |

OTHER PUBLICATIONS

"Silicalite, A New Hydrophobic Crystalline Silica Mol Sieve", Flanigan et al., Nature 271, 512–516, (Feb. 9, 1978).
"Silicalite-2, A Silica Analogue of the Aluminosilicate Zeolite ZSM-11", Bibby et al. Nature 280, 664–665, (Aug. 23, 1979).
"Pentasil Family of High-Silica Crystalline Materials", Kokotailo et al., Proceedings of a Conference, pp. 133–139, Apr. 18–20, 1979.
"Chemical and Physical Properties of the ZSM-5 Substitutional Series", Olsen et al., Journal of Catalysis 61, 390–396, (1980).

Primary Examiner—Delbert E. Gantz
Assistant Examiner—G. E. Schmitkons
Attorney, Agent, or Firm—D. A. Newell; S. R. LaPaglia; W. L. Stumpf

[57] ABSTRACT

Hydrocarbon conversion in the presence of a low-sodium form crystalline silicate converts normal and slightly branched paraffins, at least in part, to olefins.

12 Claims, No Drawings

HYDROCARBON CONVERSION WITH LOW-SODIUM SILICALITE

TECHNICAL FIELD

This invention relates to a process for hydrocarbon conversion using a low-sodium crystalline silicate. In particular, the invention relates to the selective conversion of normal and slightly branched paraffins into a lower molecular weight product mixture containing a substantial amount of olefins.

Paraffins are normal components of both natural and synthetic hydrocarbons. The presence of these components is often undesirable. For example, paraffinic waxes impart a high pour point to the high-boiling oil fractions which contain them. Even in lower-boiling hydrocarbon fractions such as naphthas and motor gasolines, the presence of normal and slightly branched paraffins may be undesirable in that they tend to reduce significantly the octane number of the gasoline fraction. Procedures known in the art for removing these undesirable paraffins and paraffinic waxes include both physical dewaxing processes, including solvent dewaxing, and catalytic dewaxing processes.

Although catalytic dewaxing processes using crystalline zeolites have been reported in the literature, the dewaxing often produces only light paraffinic gases which are not particularly reactive and so are burned or used as LPG fuels, e.g., U.S. Pat. No. RE-28,398, Chen et al., Apr. 22, 1975 (dewaxing using ZSM-5-type zeolites). Other processes do produce chemically more useful compounds such as olefins, but require lower pressures to prevent hydrogenation of the olefins produced, e.g., U.S. Pat. No. 4,171,257, O'Rear et al., Oct. 16, 1979 (production of olefins by dewaxing with H-ZSM-5 at low pressures).

It can be appreciated that there is a continuing search for more efficient paraffin removal and dewaxing processes which can be used over wide temperatures and pressure ranges yet which still produce chemically valuable olefins rather than the less useful paraffinic gases.

The present invention is such a process. I have discovered that the large amounts of olefins produced by crystalline silicates from the normal and slightly branched paraffins present in hydrocarbon feedstocks, even at high pressures, can be increased through use of crystalline silicates having a low sodium content.

BACKGROUND ART

Crystalline silicates have been prepared and reported in the literature. U.S. Pat. No. 4,073,865, Flanigen et al., Feb. 14, 1978, incorporated herein by reference, discloses crystalline silica polymorphs and their method of preparation. U.S. Pat. No. 4,061,724, Grose et al., Dec. 6, 1977, incorporated herein by reference, discloses a crystalline silica polymorph called "silicalite" and a method of preparation. U.S. Pat. No. RE-29,948, Dwyer et al., Mar. 27, 1979, incorporated herein by reference, discloses a crystalline silicate essentially free of Group IIIA metals, a method for preparing the silicate, and processes of using the silicate.

Flanigen et al., Nature, 271, 512–516 (Feb. 9, 1978) discuss the physical and adsorption characteristics of silicalite. Bibby, et al., Nature, 280, 664–665 (Aug. 23, 1979) report the preparation of a crystalline silicate called "silicalite-2".

Anderson et al., J. Catalysis 58, 114–130 (1979) discuss catalytic reactions and sorption measurements carried out on ZSM-5 and silicalite.

TECHNICAL DISCLOSURE

The discovery of the present invention is embodied in a process for producing olefins from normal paraffins, slightly branched paraffins, and mixtures thereof, comprising contacting a feed which comprises said paraffins with a crystalline silicate containing less than about 0.1 weight percent sodium, and producing an effluent of greater olefin content than said feed.

The discovery of the present invention is also embodied in a process for producing olefins from normal paraffins, slightly branched paraffins, and mixtures thereof, comprising contacting a feed which comprises said paraffins with a composition substantially free of hydrogenation activity comprising a crystalline silicate containing less than about 0.1 weight percent sodium composited in a matrix which is substantially free of cracking activity, said contacting occurring at a temperature from about 285° to about 595° C., a pressure from about 14 to about 205 bar, and a hydrogen to hydrocarbon volume ratio from about 350 to about 3650 liters hydrogen/liter hydrocarbon; and producing an effluent of greater olefin content than said feed, wherein said olefin content is at least 10 weight percent of converted feed.

The hydrocarbon feed used in the present invention may be any normally liquid hydrocarbon material, for example, naphtha, reformate, kerosene, diesel fuel, heating fuel, jet fuel, gas oil and lube oil stocks. Those hydrocarbon feeds boiling above 200° C. are particularly suitable as they are typically subjected to dewaxing processes during refining to produce lube oils and mid-distillate fuels. Preferably, the feed contains at least 5 weight percent normal and slightly branched paraffins, i.e., from 5 to 40 weight percent, and more preferably at least 10 weight percent normal and slightly branched paraffins, e.g., from 10 to 30 weight percent normal and slightly branched paraffins.

If sulfur compounds are present in the feed, sulfur can react with the olefins produced to yield mercaptans. To lessen the possibility of the mercaptan producing reaction taking place, the feed can be lightly hydrotreated to less than 100 parts per million by weight organic sulfur and preferably to less than 50 parts per million by weight organic sulfur. The presence of organonitrogen compounds has not been found to be detrimental to the present process, thus the feed may contain any level of nitrogen such as 300 or 500 ppm or more. Even so, it is preferred that the level of organonitrogen compounds be less than about 25 and more preferably less than about 10 ppm by weight.

The feed is contacted with the low-sodium crystalline silicate at standard cracking conditions including an elevated temperature, usually from about 290° C. to about 595° C., and more preferably from about 340° C. to about 480° C.; a pressure from subatmospheric to about 205 bar, preferably from atmospheric to about 140 bar, and more preferably from atmospheric to about 35 bar; and a liquid hourly space velocity of from about 0.1 to about 50 v/v/hr and preferably from about 0.5 to about 25 v/v/hr.

If desired, the process of the present invention can be carried out in the presence of hydrogen or added hydrogen at a system pressure up to 205 bar and preferably from 14 to 205 bar. The hydrogen can be dissolved in the feed or it can be present as a gas at partial pressures 1.3 to about 1.5.

As noted above, crystalline silicates which can be used in the process of the present invention have been reported in the literature. Silicalite (U.S. Pat. No. 4,061,724) has, as synthesized, a specific gravity at 25° C. of 1.99 ±0.05 g/cc as measured by water displacement. In the calcined form (600° C. in air for one hour), silicalite has a specific gravity of 1.70±0.05 g/cc. With respect to the mean refractive index of silicalite crystals, values obtained by measurement of the as synthesized form and the calcined form (600° C. in air for one hour) are, respectively, 1.48±0.01 and 1.39±0.01.

The x-ray powder diffraction pattern of silicalite (600° C. calcination in air for one hour) has as its six strongest lines (i.e., interplanar spacings) those set forth in Table A ("S"—strong, and "VS"—very strong):

TABLE A

| d-A | Relative Intensity |
|---|---|
| 11.1 ± 0.2 | vs |
| 10.0 ± 0.2 | vs |
| 3.85 ± 0.07 | vs |
| 3.82 ± 0.07 | s |
| 3.76 ± 0.05 | s |
| 3.72 ± 0.05 | s |

Table B shows the x-ray powder diffraction pattern of a typical silicalite composition containing 51.9 mols of $SiO_2$ per mol of $(TPA)_2O$, prepared according to the method of U.S. Pat. No. 4,061,724, and calcined in air at 600° C. for one hour.

TABLE B

| d-A | Relative Intensity | d-A | Relative Intensity |
|---|---|---|---|
| 11.1 | 100 | 4.35 | 5 |
| 10.02 | 64 | 4.25 | 7 |
| 9.73 | 16 | 4.08 | 3 |
| 8.99 | 1 | 4.00 | 3 | having quaternary carbon atoms from those having carbon-to-carbon linkages of lower value (e.g., normal and slightly branched paraffins).

The crystalline silicates of U.S. RE-29,948 are disclosed as having a composition, in the anhydrous state:

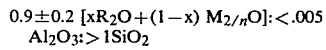

$$0.9\pm0.2\ [xR_2O+(1-x)\ M_{2/n}O]: <.005$$
$$Al_2O_3: > 1 SiO_2$$

where M is a metal, other than a metal of Group IIIA, n is the valence of said metal, R is an alkyl ammonium radical and x is a number greater than 0 but not exceeding 1. The organosilicate is characterized by the x-ray diffraction pattern of Table C.

TABLE C

| Interplanar spacing d(a): | Relative Intensity |
|---|---|
| 11.1 | s |
| 10.0 | s |
| 7.4 | w |
| 7.1 | w |
| 6.3 | w |
| 6.04 | w |
| 5.97 | w |
| 5.56 | w |
| 5.01 | w |
| 4.60 | w |
| 4.25 | w |
| 3.85 | vs |
| 3.71 | s |
| 3.04 | w |
| 2.99 | w |
| 2.94 | w |

The crystalline silicate polymorph of U.S. Pat. No. 4,073,865 is disclosed as having a specific gravity of 1.70±0.05 g/cc. and a mean refractive index of 1.39±0.01 after calcination in air at 600° C. It is prepared by a hydrothermal process in which fluoride anions are included in the reaction mixture. The crystals, which can be as large as 200 microns, exhibit a substantial absence of infrared adsorption in the hydroxyl-stretching region and also exhibit an exceptional degree of hydrophobicity. They exhibit the x-ray diffraction pattern of Table D.

TABLE D

| d(A) | Intensity |
|---|---|
| 11.14 | 91 |
| 10.01 | 100 |
| 9.75 | 17 |
| 8.99 | 1 |
| 8.04 | 0.5 |
| 7.44 | 0.5 |
| 7.08 | 0.2 |
| 6.69 | 4 |
| 6.36 | 6 |
| 5.99 | 10 |
| 5.71 | 5 |
| 5.57 | 5 |
| 5.37 | 1 |
| 5.33 | 1 |
| 5.21 | 0.3 |
| 5.12 | 1.5 |
| 5.02 | 3 |
| 4.97 | 6 |
| 4.92 | 0.6 |
| 4.72 | 0.5 |
| 4.62 | 2 |
| 4.47 | 0.6 |
| 4.36 | 3 |
| 4.25 | 4 |
| 4.13 | 0.5 |
| 4.08 | 1.5 |
| 4.00 | 3 |
| 3.85 | 44 |
| 3.82 | 25 |
| 3.71 | 21 |
| 3.65 | 5 |
| 3.62 | 5 |
| 3.59 | 1 |
| 3.48 | 1.5 |
| 3.45 | 3 |
| 3.44 | 3 |
| 3.35 | 3 |
| 3.31 | 5 |
| 3.25 | 1.5 |
| 3.23 | 0.8 |
| 3.22 | 0.5 |

The literature describes the following method for the preparation of the crystalline silicate called "silicalite-2" (Nature, August, 1979):

The silicalite-2 precursor is prepared using tetra-n-butylammonium hydroxide only, although adding ammonium hydroxide or hydrazine hydrate as a source of extra hydroxyl ions increases the reaction rate considerably. A successful preparation is to mix 8.5 mol $SiO_2$ as silicic acid (74% $SiO_2$), 1.0 mol tetra-n-butylammonium hydroxide, 3.0 mol $NH_4OH$ and 100 mol water in a steel bomb and heat at 170° C. for 3 days. The precursor crystals are ovate in shape, approximately 2–3 micromillimeters long and 1–1.5 micromillimeters diameter. The silicalite-2 precursor will not form if Li, Na, K, Rb or Cs ions are present, in which case the precursor of the U.S. Pat. No. 4,061,724 silicalite is formed. The size of the tetraalkylammonium ion is reported as being critical because replacement of the tetra-n-butylammonium hydroxide by other quaternary ammonium hydroxides (such as tetraethyl, tetrapropyl, triethylpropyl, and triethylbutyl hydroxides) results in amorphous products. Silicalite-2 precursor is stable at extended reaction times in the hydrothermal system. The amount of Al present in silicalite-2 depends on the purity of the starting materials and is reported as being <5 ppm. The precursor contains occluded tetraalkylammonium salts which, because of their size, are removed only by thermal decomposition. Thermal analysis and mass spectrometry show that the tetraalkyl ammonium ion decomposes at approximately 300° C. and is lost as the tertiary amine, alkene and water. This is in contrast to the normal thermal decomposition at 200° C. of the same tetraalkylammonium salt in air.

The Nature article further reports that the major differences between the patterns of silicalite and silicalite-2 are that peaks at 9.06, 13.9, 15.5, 16.5, 20.8, 21.7, 22.1, 24.4, 26.6 and 27.0 degrees 2 (CuK alpha radiation) in the silicalite x-ray diffraction pattern are absent from the silicalite-2 pattern. Also peaks at 8.8, 14.8, 17.6, 23.1, 23.9 and 29.9 degrees are singlets in the silicalite-2 pattern rather than doublets as in the silicalite pattern. These differences are reported as being the same as those found between the diffraction patterns of the aluminosilicates, orthorhombic ZSM-5 and tetragonal ZSM-11. Unit cell dimensions reported as calculated on the assumption of tetragonal symmetry for silicalite-2 are a=20.04; b=20.04; c=13.38. The measured densities and refractive indices of silicalite-2 and its precursor are reported at 1.82 and 1.98 g cm$^{-3}$ and 1.41 and 1.48 respectively.

The preparation of crystalline silicates generally involves the hydrothermal crystallization of a reaction mixture comprising water, a source of silica and an organic templating compound at a pH of 10 to 14. Representative templating moieties include quaternary cations such as $XR_4$ wherein X is phosphorous or nitrogen and R is an alkyl radical containing from 2 to 6 carbon atoms, e.g., tetrapropyl ammonium hydroxide or halide, as well as alkyl hydroxyalkyl compounds, organic amines and diamines, and heterocycles such as pyrrolidone.

When the organic templating compound is provided to the system in the hydroxide form in sufficient quantity to establish a basicity equivalent to the pH of 10 to 14, the reaction mixture need contain only water and a reactive form of silica as additional ingredients. In those cases in which the pH is required to be increased to above 10, ammonium hydroxide or alkali metal hydroxides can be suitably employed for that purpose, particularly the hydroxides of lithium, sodium or potassium. It has been found that not more than 6.5 mols of alkali metal oxide per mol-ion of organic templating species are required for this purpose even if none of the templating compound is provided in the form of its hydroxide.

The source of silica in the reaction mixture can be wholly or in part alkali metal silicate but should not be employed in amounts greater than that which would change the molar ratio of alkali metal to organic templating compound set forth above. Other silica sources include solid reactive amorphous silica, e.g., fume silica, silica sols, silica gel, and organic orthosilicates. Since the nature of the reaction system is favorable for the incorporation of alumina as an impurity into the crystalline silica product, care should be exercised in the selection of the silica source so as to minimize the content of alumina as an impurity. Commercially available silica sols can typically contain from 500 to 700 ppm $Al_2O_3$, whereas fume silicas can contain from 80 to 2000 ppm of $Al_2O_3$ impurity. Ethyl orthosilicate is a preferred silica source as it can be obtained with very low alumina contents. Small quantities of $Al_2O_3$ present as impurities in the crystalline silicate product do not appear to significantly alter its essential olefin producing properties.

little or no hydrogenative or cracking activity, such as calcium, strontium, barium, zinc, silver, or the rare earth metals. As used herein, "hydrogenation activity" refers to the capability to adsorb and dissociate molecular hydrogen.

The residual alkali metal in the product can also be removed by washing with an aqueous acid solution of sufficient strength, e.g., hydrochloric acid. The crystal structure is not otherwise affected by contact with strong mineral acids even at elevated temperatures due to the lack of acid-soluble constituents in its crystal structure.

The crystalline silicate may be in any convenient form that can be required for ordinary fixed bed, fluidized bed or slurry use. Preferably it is in a fixed bed reactor and in a composite with a porous inorganic binder or matrix in such proportions that the resulting product contains from 1 to 95% by weight and preferably from 10 to 70% by weight of silicalite in the final composite.

The preferred crystalline silicates are those disclosed in U.S. Pat. No. 4,061,724 and U.S. Pat. No. RE-29,948.

The terms "matrix" and "porous matrix" include inorganic compositions with which the silicalite can be combined, dispersed, or otherwise intimately admixed wherein the matrix is not catalytically active in a hydrocarbon cracking sense, i.e., contains substantially no acid sites, and has substantially no hydrogenation activity. The porosity of the matrix can either be inherent in a particular material or it can be caused by a mechanical or chemical means. Representative of satisfactory matrices include pumice, firebrick, diatomaceous earth and inorganic oxides. Representatives of inorganic oxides include alumina, silica, naturally occurring and conventionally processed clays, for example, bentonite, kaolin, sepiolite, attapulgite, and halloysite. The preferred matrices have few if any acid sites and therefore have little or no cracking activity. Silica and alumina are especially preferred. The use of a non-acidic matrix is preferred to maximize olefin production.

processing arts, whereas their chemically less reactive alkane counterparts are far less desirable products. The yield of olefins will vary depending upon the particular feed composition, form of the silicate and reaction conditions employed. As used herein, "substantial olefin fraction" means that the portion of the effluent produced by contacting the hydrocarbon feed with the low sodium crystalline silicate and which boils below the initial boiling point of the feed will contain at least 10 weight percent olefins, preferably at least 20 weight percent olefins, more preferably at least 30 weight percent olefins, still more preferably at least 40 weight percent olefins, and most preferably at least 50 weight percent olefins. "Converted hydrocarbons" means that portion of the hydrocarbon product which boils below the initial boiling point of the feed.

The invention is illustrated by the following examples.

EXAMPLE I

A crystalline silicate composition containing 400 ppmw sodium was mixed in the proportion of one part by weight silicalite to two parts by weight alumina. The composition was tested for hydrocarbon conversion with a 391° C. (725° F.+) hydrocarbon fraction having the properties set forth in Table E:

TABLE E

| Feed | Light Neutral Lube Oil |
|---|---|
| Boiling Range | |
| 10/50/90%, °C. | 391/403/432 |
| ppm N/ppm S | 1.2/6.1 |
| Pour Point °C. | +29 |
| Viscosity Index | 112 |

Reaction conditions included a temperature of 405° C. and 416° C., pressure of 70 bar, LHSV of 2 and 1,780 L H$_2$/L oil (10,000 SCF/B). The resulting liquid products were analyzed as follows:

UNITED STATES PATENT AND TRADEMARK OFFICE
CERTIFICATE OF CORRECTION

PATENT NO. : 4,309,276
DATED : January 5, 1982
INVENTOR(S) : Stephen J. Miller

It is certified that error appears in the above-identified patent and that said Letters Patent are hereby corrected as shown below:

Col. 4, line 15, in Table B, the relative intensity for 3.13 which reads "05", should read --0.5--.

Col. 9, line 38, in Table G, the yield-wt. % for $C_3^=$ which reads "3.9" for Run A and "3.0" for Run B, should read --0-- for Run A and --0-- for Run B.

Signed and Sealed this

Thirteenth Day of April 1982

[SEAL]

Attest:

GERALD J. MOSSINGHOFF

Attesting Officer — Commissioner of Patents and Trademarks

UNITED STATES PATENT AND TRADEMARK OFFICE
CERTIFICATE OF CORRECTION

PATENT NO. : 4,309,276
DATED : January 5, 1982
INVENTOR(S) : Stephen J. Miller

It is certified that error appears in the above-identified patent and that said Letters Patent are hereby corrected as shown below:

Col. 4, line 15, in Table B, the relative intensity for 3.13 which reads "05", should read --0.5--.

Col. 9, line 38, in Table G, the yield-wt. % for $C_3^=$ which reads "3.9" for Run A and "3.0" for Run B, should read --0-- for Run A and --0-- for Run B.

Signed and Sealed this

Thirteenth Day of April 1982

[SEAL]

Attest:

Attesting Officer

GERALD J. MOSSINGHOFF

Commissioner of Patents and Trademarks